United States Patent [19]
Wasson

[11] Patent Number: 5,871,285
[45] Date of Patent: Feb. 16, 1999

[54] HYBRID COMBINED HYDROSTATIC AND HYDRODYNAMIC BEARING WITH ENHANCED STABILITY AND REDUCED FLOW RATE

[75] Inventor: Kevin Wasson, Enfield, N.H.

[73] Assignee: Aesop, Inc., Concord, N.H.

[21] Appl. No.: 943,343

[22] Filed: Oct. 3, 1997

Related U.S. Application Data

[63] Continuation of Ser. No. 598,731, Feb. 8, 1996, abandoned.

[51] Int. Cl.$^6$ ..................................................... F16C 32/06
[52] U.S. Cl. ............................................................. 384/118
[58] Field of Search ................................... 384/118, 292, 384/111, 120, 399

[56] References Cited

U.S. PATENT DOCUMENTS 2,249,843  7/1941  Marsland ................................ 384/292
5,415,476  5/1995  Onishi .................................... 384/292
5,466,071  11/1995  Slocum ................................... 384/118

*Primary Examiner*—Lenard A. Footland
*Attorney, Agent, or Firm*—Rines and Rines

[57] ABSTRACT

A rotary hybrid bearing that utilizes both hydrostatic and hydrodynamic principles to support a rotatable shaft in which lubricating fluid is fed through orifices or other flow restriction devices to a plurality of recesses, and finally across lands and out of the bearing. The shaft is rotated in such a direction as to pump the fluid back through grooves from lands to recesses, thereby reducing the flow rate of lubricant through the bearing. The recesses are located at an angular position from lands such that a force is generated by hydrostatic action that substantially cancels the destabilizing force generated by hydrodynamic action, thereby greatly enhancing the stability of the bearing and enabling higher rotational speeds.

4 Claims, 4 Drawing Sheets

HYBRID COMBINED HYDROSTATIC AND HYDRODYNAMIC BEARING WITH ENHANCED STABILITY AND REDUCED FLOW RATE

This is a file wrapper continuation of parent application Ser. No. 08/598,731, filed Feb. 8, 1996, abandoned.

The present invention relates to hydrostatic and hydrodynamic bearings and the like, being more particularly directed to rotary motion bearings that are supported by a thin film of pressurized fluid—liquid or gaseous—including, among other fluids, water and air, and hereinafter sometimes generically referred to and interchangeably as "hybrid" bearings meaning that the load-carrying capability is generated by a combination of hydrostatic and hydrodynamic principles.

More specifically, the invention is concerned with a system that includes a round, cylindrical, or arcuate bearing housing which guides the rotary motion of a round internal coaxial shaft that maintains its distances from the concentric surrounding cylindrical bearing housing surface sections by means of a thin pressurized film of fluid emanating from flow restriction devices feeding recesses in the cylindrical bearing housing surface. The invention uses an innovative technique to achieve enhanced stability by orienting the hydrostatic component of the bearing restoring force such that the destabilizing component of the hydrodynamic restoring force is substantially eliminated. This is accomplished with the use of grooves that connect the central bearing recesses to the outlet resistance lands which are located at a distance circumferentially displaced from the recesses. In addition, the shaft is rotated in such a direction as to pump some of the fluid emanating from the flow restriction devices (e.g., orifices) back through the grooves to the recesses, thereby reducing the flow rate of lubricant from the bearing and reducing the pumping power required to pressurize the bearing and generate load-carrying capability.

BACKGROUND

Hybrid bearings have been widely used in many applications ranging from machine tool spindles to high-speed turbomachinery. Particularly in machine tool spindles that use air or water as the lubricating fluid, the bearings are likely to experience deleterious combined hydrostatic and hydrodynamic effects. The speed with which these spindles can operate is often considerably less than the desired speed because of the stability limitations of the bearings. A bearing with enhanced stability, such as provided by the present invention, later explained, would enable higher speeds and advance the start-of-the-art in high-speed machining applications. In optics grinding applications, for example, the ability to achieve higher speeds would enable a higher level surface finish and a greater quality of optics. In milling applications, as another example, the ability to achieve higher spindle speeds would enable higher rates of material removal and lower manufacturing costs.

There are many turbomachinery applications, furthermore, in which hybrid bearings are attractive. Hybrid fluid film bearings are predominantly used in turbopumps used to pump cryogenic fluids such as liquid oxygen and liquid hydrogen (See, for example, "Hydrostatic Bearings for Cryogenic Rocket Engines" by J. M. Reddecliff and J. H. Vohr, Journal of Lubrication Technology, July 1969, pp. 557–575). Again, however, such machines are limited in their speed capabilities due to stability limitations of the bearings. An improved bearing that could be used to achieve higher speeds would also enable such machines to be built with reduced size and weight and higher pump efficiencies.

Conventional hybrid bearings utilize orifices or capillaries to compensate multi-recess journal bearings with, generally, rectangular recesses. The recesses help to establish more uniform hydrostatic pressure as well as interrupt the circumferential fluid flow to reduce the destabilizing hydrodynamic bearing forces generated by the rotation of the shaft. Destabilizing forces, however, are prevalent in these bearings and so they are limited in the maximum speed that they can achieve. Researchers and inventors have focused on improving the stability of these bearings in recent years; and although some improvement has been made in conventional design by orienting the orifices at an angle and by making minor changes to the shape of the bearing recesses (See, for example, "Experimental Test Results for Four High-Speed, High-Pressure, Orifice-Compensated Hybrid Bearings" by N. M. Franchek and D. W. Childs, *Journal of Tribology*, Vol. 116, January 1994, pp. 147–153), stability problems still exist.

OBJECTS OF INVENTION

Accordingly, it is an object of the present invention to provide a new and improved hybrid bearing that can support a rotatable cylindrical shaft with improved stability so that higher rotation rates can be achieved.

Another object is to provide in such apparatus, a novel method of operation whereby the flow rate of fluid through the bearing is minimized, thereby minimizing the pumping power required to pressurize the bearing.

These and still further objectives are addressed hereinafter are more particularly delineated in the appended claims.

SUMMARY

In summary, however, the present invention embraces a fluidstatic bearing having opposed bearing surface sections in a cylindrical housing which concentrically surrounds a cylindrical shaft that extending coaxially downwardly therealong and therebetween, with each bearing surface section having similar and symmetrical pockets or recesses and grooves in the surface through which pressurized fluid travels to provide a thin film of fluid interposed in the gaps between the shaft and the housing surfaces. Lubricating fluid is fed through orifices in the bearing housing to recesses located within the inner surface of the housing, and finally across lands and out of the bearing. The recesses on the inner surface of the bearing housing are located at a distance circumferentially from the lands such that a hydrostatic force is generated that cancels the destabilizing force generated by hydrodynamic action. The shaft is rotated in a direction such that fluid is pumped from the outlet lands back to the recesses so that the leakage rate of fluid from the bearing is reduced, thereby miring the pumping power required to pressurize the bearing and attain adequate load-carrying capability.

Preferred and best mode designs and techniques are hereinafter described.

DRAWINGS

The invention will now be described with reference to the accompanying drawings in which.

Figure 5C:
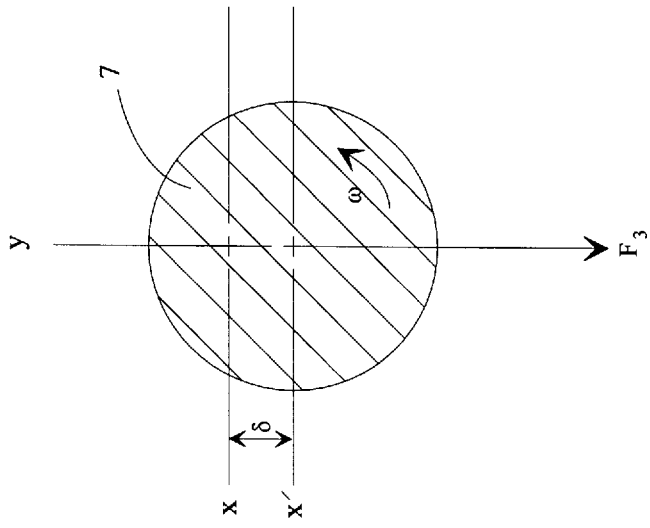
Figure 5B:
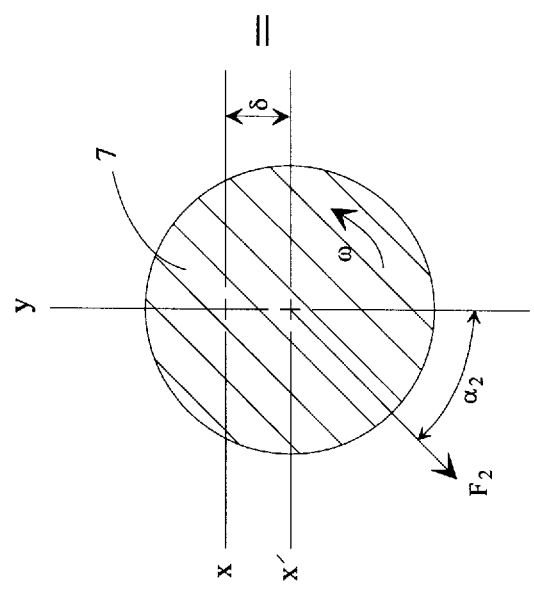
Figure 5A:
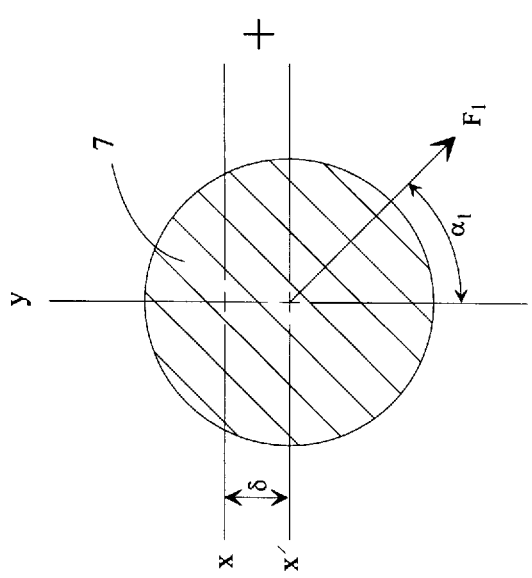
Figure 6:
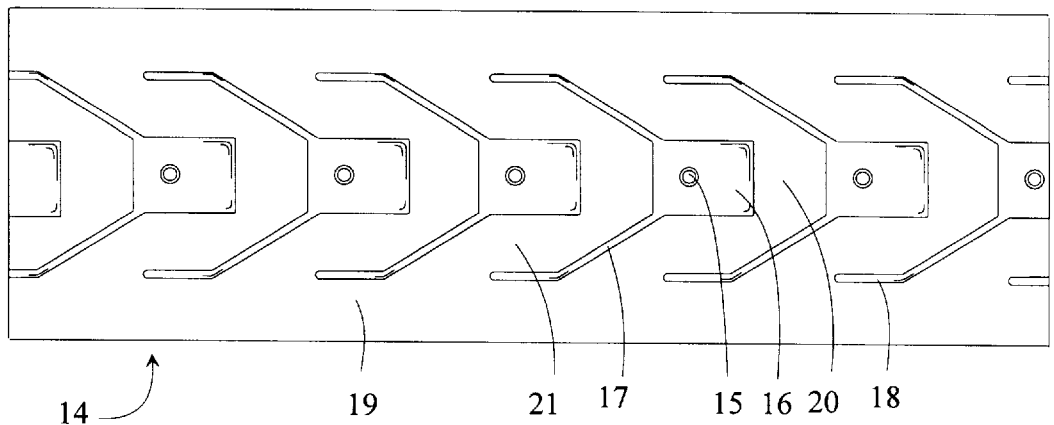
Figure 7:
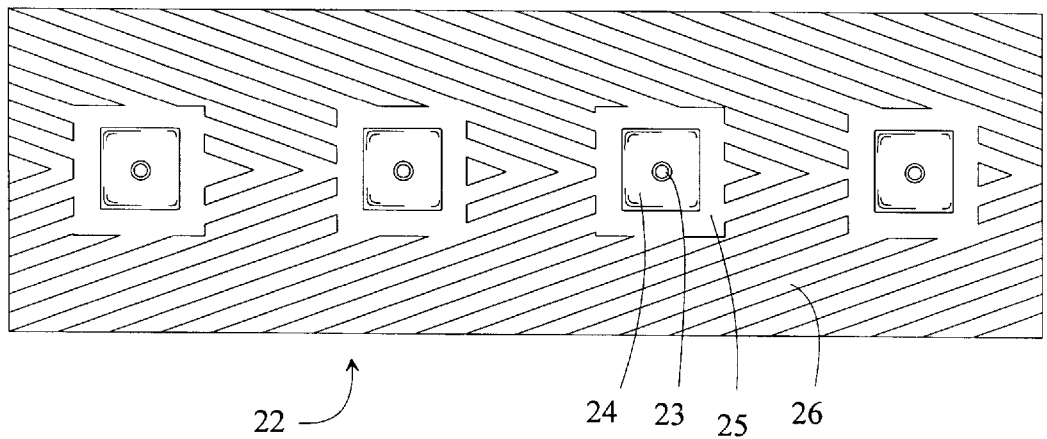
Figure 8:
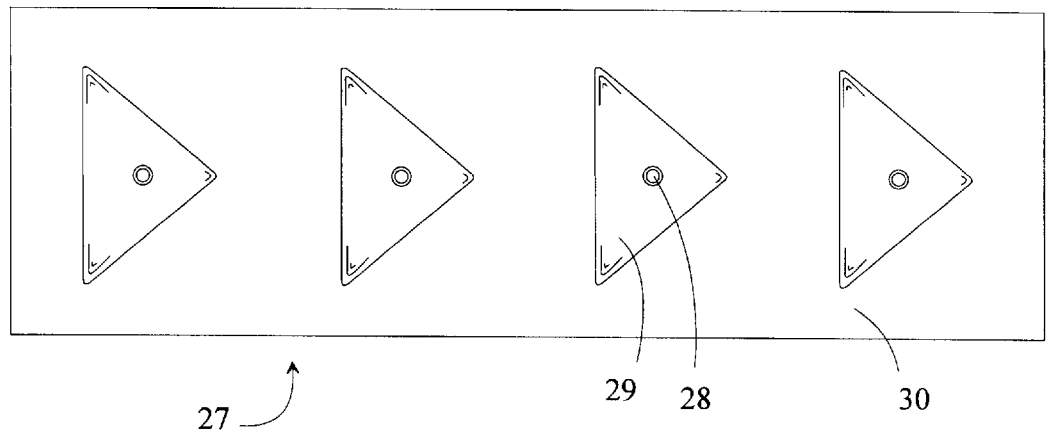

FIGS. 5A, 5B and 5C are respective end views of three shafts that are supported by bearings of the present invention (not shown); the first shaft (FIG. 5A) being stationary and supported only by hydrostatic principle; the second shaft (FIG. 5B) rotating but using no hydrostatic supply pressure so that it is supported only by hydrodynamic principle; and the third shaft (FIG. 5C) rotating and using supply pressure such that it is supported by both hydrostatic and hydrodynamic principles; and FIGS. 6, 7 and 8 are respectively flat projections (unwrapped) of the arcuate cylindrical surface sections of bearings constructed in accordance with the present invention (FIG. 6) and the prior art (FIGS. 7 and 8).

PREFERRED EMBODIMENT(S) OF THE INVENTION

While, as later explained, the technique of the invention is useful with any type of rotary hydrostatic bearing using any type of restrictors, and on either or both of the shaft and/or the housing bore, a preferred bearing and construction is of the compensating type disclosed in U.S. Pat. No. 5,281,032 and in co-pending application Ser. No. 237,852 of common assignee herewith; and for illustrative purposes, the invention will be described in connection therewith.

Figure 1:
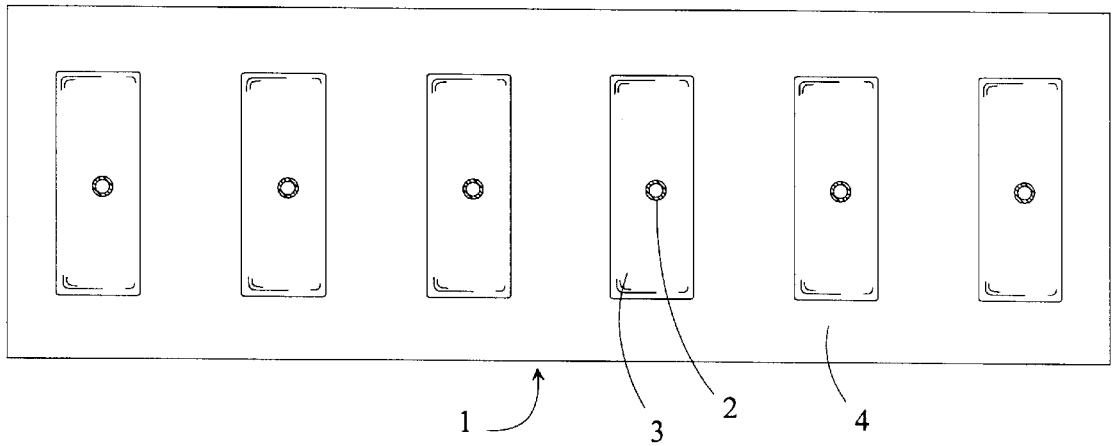
FIG. 1 is a flat projection (unwrapped) of the arcuate cylindrical surface sections of a conventional hybrid (combined hydrostatic and hydrodynamic) bearing.
Figure 2:
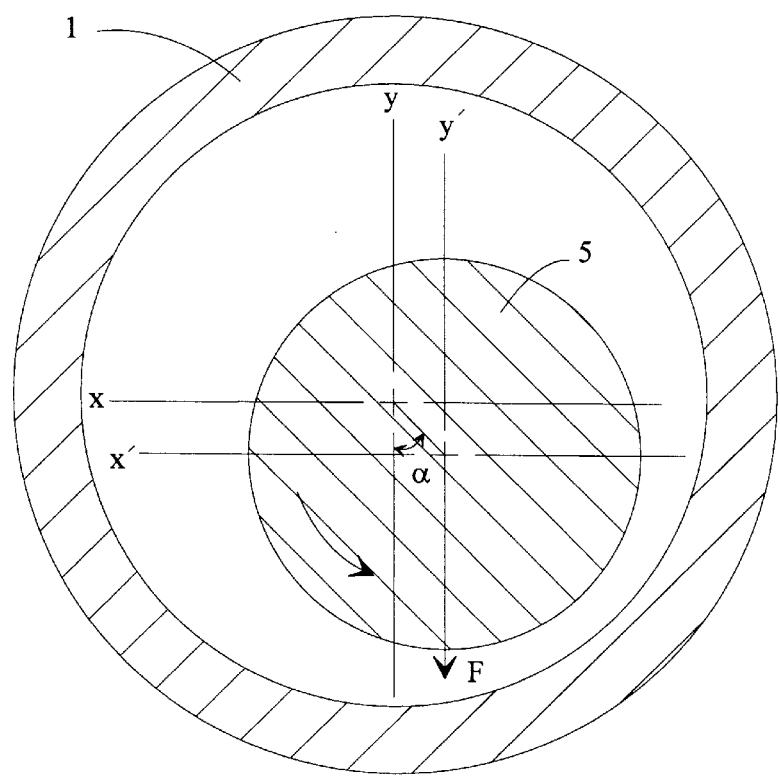
FIG. 2 is an end view of the rotating shaft and housing of a conventional hybrid bearing which, for the purpose of clarity, has an exaggerated gap between the shaft and housing, and in which a force has been applied to the shaft to deflect it to a new equilibrium position.

A flat projection (unwrapped) of the arcuate cylindrical surface sections of a conventional hybrid (combined hydrostatic and hydrodynamic) bearing is shown in FIG. 1. Lubricating fluid flows through the orifices 2 which serve to compensate the bearing, into the recesses 3, and across the lands 4 and out of the bearing 1. Shown in FIG. 2 is a longitudinally extending shaft 5 rotating inside of the bearing housing 1. For the purpose of clarity, the clearance between the shaft 5 and the housing 1 has been exaggerated. The origin of the x-y axes corresponds to the center the bearing housing 1, as well as the center of the shaft 5 when no external force is applied to it.

When a radial force F is applied to the shaft 5, the bearing 1 exerts a force in proportion to and in the opposite direction of the applied force so that an equilibrium position is reached. The origin of the x'-y' axes corresponds to the center of the shaft at the new equilibrium position. There is an angle, α, between the direction of the applied force and the direction of the displacement of the center of the shaft 5. This angle is commonly termed the attitude angle.

When pressurized fluid is fed to the bearing 1 and the shaft 5 is not rotating, the load-carrying capacity of bearing 1 is purely hydrostatic and the angle a is equal to zero. As the shaft 5 is rotated, further load-carrying capacity is developed by hydrodynamic action. The hydrodynamic action also creates forces in the fluid film that can cause the angle α to increase to over 45 degrees. The forces in the bearing fluid that cause the angle α to be greater than zero are destabilizing forces that cause the shaft 5 to "whirl," or orbit, about the origin of the x-y axes, the center of bearing 1. For sufficiently low speeds, the whirling motion caused by the destabilizing forces is sufficiently damped by the damping forces in the bearing. At some critical speed, however, the whirling motion increases in amplitude until the shaft 5 makes contact with the housing 1 and the motion of shaft 5 is seized.

Figure 3:
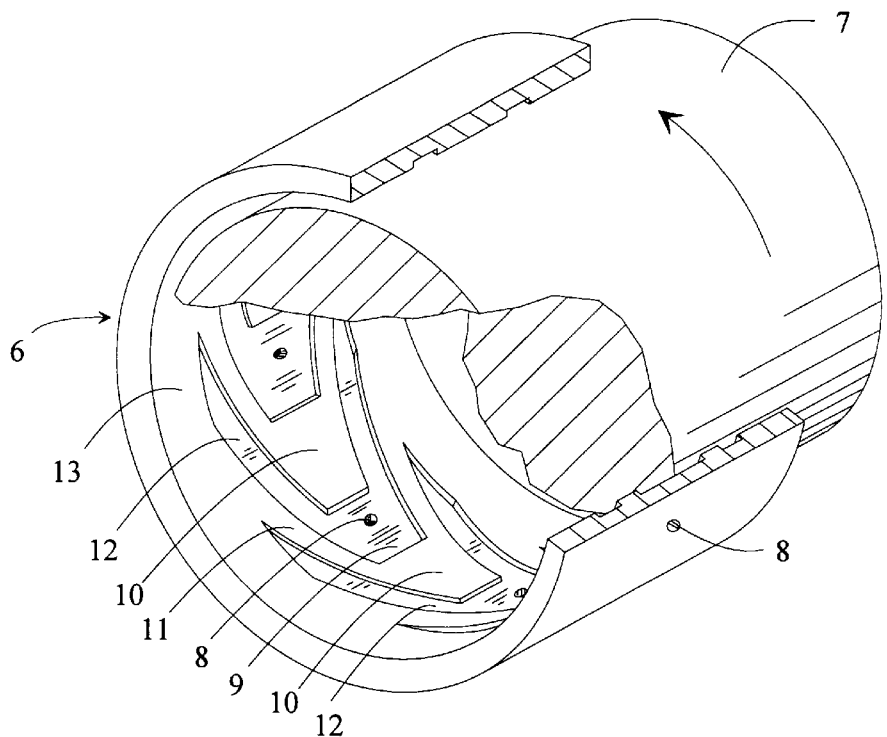
FIG. 3 is a partial isometric view of a bearing constructed in accordance with the present invention which, also for the purpose of clarity, has an exaggerated gap between the shaft and housing, and a section of the shaft cut away to reveal the geometry on the inner surface of the housing.

The present invention provides an improved fluid film bearing structure and operational method theory that overcome the limitations of the conventional hybrid bearing, shown in a partial isometric view in FIG. 3. For the purpose of clarity of illustration, the clearance between the shaft 7 and housing 6 has again been exaggerated. A cylindrical longitudinally extending shaft 7 of the invention (partially cut away in the figure to show more clearly the bearing geometry) moves coaxially inside a concentric outer cylindrical bearing housing 6. The motion of the shaft 7 about (or along) the horizontal or z-axis is guided by arcuate or cylindrical (or portions of a cylinder herein termed cylindrical) bearing recesses, of which there are can be any multitude but at least three.

Figure 4:
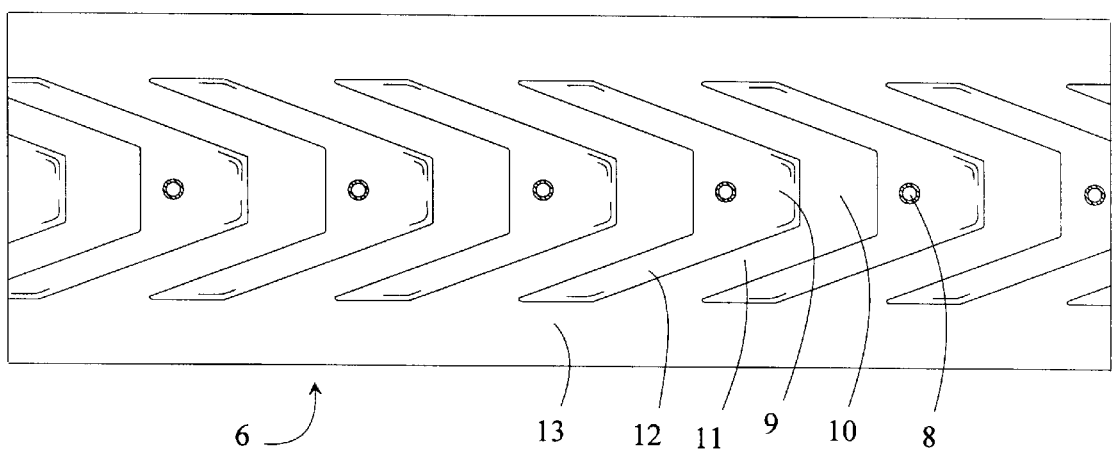
FIG. 4 is a flat projection (unwrapped) of the arcuate cylindrical surface sections of a bearing constructed in accordance with the present invention.

In FIG. 3 and FIG. 4, fluid enters the bearing 6 at high pressure from a pressurizing pumped source through restricted orifices 8. It then flows into a plurality or plethora of recesses 9, down along the laterally spaced and forwardly extending pairs of diverging grooves 12, and across the lands 10, 11, and 13 and out of the bearing 6. The lands 10 and 11 are displaced in the regions between the pairs of diverging grooves 12 that flank or overlap, at least partially, the next successive recess and its feed orifice. These lands 10 and 11 serve the purpose of isolating the pressures in the recesses 9 when the shaft 7 is displaced eccentric to the housing 6 by an applied load, thereby enabling a restoring force to be generated by hydrostatic action. The lands 10 and 11 also serve to interrupt the flow of fluid circumferentially when the shaft 7 rotates, thereby improving the bearing stability.

The depth of the recesses 9 and grooves 12 are chosen as is known by those skilled in the art of compressible-fluid hydrostatic bearing design, to be large enough such that the resistance to fluid flow in the recesses 9 and grooves 12 is substantially less than that across the lands 13, thereby manning the spread of hydrostatic pressure in these areas. The grooves are generally narrower and longer than the recesses as shown. However, the total recess volume must be kept small in order to prevent the occurrence of pneumatic hammer instability. Generally, the ratio of the sum of the volume of the recess 9 and the volume of the grooves 12 to the volume of fluid in the clearance between the shaft 7 and the bearing 6 should be made as small as possible.

FIG. 3 shows the preferred direction of shaft rotation (arrow) for bearings constructed in accordance with the present invention. The direction of rotation shown is preferred to maximize stability and to minimize the flow rate. The rotational motion of the shaft 7 relative to the housing induces a flow of fluid generally in a circumferential direction and induces a gradient in pressure along the grooves 12 from the entrance of the lands 13 to the recesses 9. This pumping action tends to reduce the flow rate of fluid through the bearing, and therefore reduces the amount of pumping power required to pressurize the bearing to achieve adequate load-carrying capability.

FIG. 5 illustrates how the present invention provides for enhanced stability. The hydrostatic and hydrodynamic effects in the bearing are visualized as separate (FIGS. 5A and 5B) and additive (FIG. 5C). Although in general this is not true, particularly at high speeds, the bearing effects are visualized for illustrative purposes. The three shafts 7 shown in FIGS. 5A, B and C are each supported by bearings of the present invention although they are not shown in the drawing in order not to complicate the same. A force $F_1$ is applied to the first shaft 7 (FIG. 5A) which is not rotating and is displaced by an amount δ. Since the shaft 7 is stationary, the bearing forces generated are only hydrostatic in nature. In a conventional hydrostatic bearing such as that of FIG. 1, the angle between the direction of the applied force and the direction of the displacement, $\alpha_1$, equals zero. However, in the present invention, the angle $\alpha_1$ can be designed to range from 0 to about 60 degrees depending on the circumferential distance between the recesses 9 and the lands 13. The next shaft of FIG. 5B is rotating but there is no supply pressure provided to the bearing, such that all of the load-carrying capacity of the bearing is the result of hydrodynamic action. A force $F_2$ is required to displace the shaft 7 by an amount δ. There is an angle $\alpha_2$ between the direction of displacement and the direction of applied force. The third shaft of FIG. 5C is rotating and the bearing which supports it is pressurized. In this case, a force $F_3$ is applied to the shaft and the angle $\alpha_3$ is equal to zero. This can be understood by realizing that $F_1$ and $F_2$ sum vectorially to become $F_3$. The destabilizing forces are cancelled, and the angle between the direction of displacement and the direction of applied force is zero. Although in practice an attitude angle of zero would be hard to achieve, it can be made very small with proper bearing design. By minimizing the attitude angle, the destabilizing forces are minimized and the stability of the bearing is greatly enhanced.

A flat projection (unwrapped) of the arcuate cylindrical surface sections of a bearing constructed in accordance with the present invention in shown in FIG. 6. In this embodiment, fluid enters the bearing 14 at high pressure through orifices 15. It then flows into a plethora of recesses 16, down the grooves 17 and 18, across the lands 19 and out of the bearing 14. The lands 20 and 21 serve the purpose of isolating the pressures in the recesses 16 as well as to interrupt the flow of fluid circumferentially when the shaft 7 rotates, thereby improving the bearing stability. Bearing 14 is very similar to bearing 6 of FIG. 3 except the groove 12 of bearing 6 has been replaced with two grooves 17 and 18 which can be made very narrow so as to keep the total volume of the recesses 16 and grooves 17 and 18 to a minimum, thereby minimizing the possibility of pneumatic hammer.

Although the improved bearing described herein is exemplarily illustrated with orifices 8 and 16 that are used for compensation, other methods used to compensate hydrostatic bearings may be used, such as capillaries and diaphragms. Also, although the improved bearing is described herein is shown in the drawings with six recesses 9 and 16, any number may be used but at least three. Though the improved bearing is shown in the drawings with a single column of recesses 9 and 16, furthermore multiple columns of recesses 9 and 16 may, if desired, be used. In addition, although the preferred embodiments herein illustrate the improved bearing with recesses 9 and 16 of a particular geometry, other geometric patterns may also be used, such as triangles, circles, and irregular patterns, so long as they provide the necessary function of uniformly spreading the hydrostatic pressure and disrupting the circumferential flow of fluid induced by the rotation of the shaft 7. The grooves 12 may be of any shape or size so long as they provide the necessary functions of routing the fluid from the recesses 9 to the lands 13 and disrupting the circumferential flow of fluid induced by the rotation of the shaft 7.

At this point, the departure of the present invention from the prior art will be evident. FIG. 7 shows a flat projection (unwrapped) of the arcuate cylindrical surface sections of a bearing of a prior art devise of the type shown, for example, in U.S. Pat. No. 4,671,676. The fluid enters the bearing 22 through orifices 23, spreads throughout recesses 24, crosses lands 25, flows down grooves 26, and exits the bearing 22. A plurality of grooves 26 directed toward recesses 23 are oriented to pump the fluid toward the recesses 23 as the shaft (not shown) rotates. This bearing 22 achieves reduced flow rate through the bearing and somewhat better stability. However, the hydrostatic portion of the load-carrying capacity is limited to a small portion of the bearing area and so the overall load capacity of this bearing 22 is substantially reduced. Moreover, the attitude angle between the direction of force and the direction of displacement under purely hydrostatic action (i.e., when the shaft is not rotating) is equal to zero. Therefore, there are no hydrostatic forces in bearing 22 that cancel the destabilizing forces caused by hydrodynamic effects when the shaft is rotating, and so the stability of bearing 22 is only marginally improved.

FIG. 8 shows a flat projection (unwrapped) of the arcuate cylindrical surface sections of another type of prior art bearing such as described, for example, in the before-referenced Franchek et al article. The fluid enters the bearing 27 through orifices 28, spreads throughout recesses 29, crosses lands 30, and exits the bearing 22. A plurality of equilateral-triangularly shaped recesses 29 are oriented with the trip of their equilateral triangles pointed in the direction that the shaft (not shown) rotates, so that the fluid exits the bearing 27 from the sides of the recesses 29 with in a more axal direction, thereby reducing the average circumferential flow of fluid and thus improving stability. The improvement in stability, however, is only marginal because the circumferential distance between the outlet lands 30 at the tips of equilateral-triangularly shaped recesses 29 and the effective centers (i.e. the location in the recess 29 where a point force would have the same affect as the pressure force distributed throughout the recess 29) is very small. The attitude angle between the direction of force and the direction of displacement under purely hydrostatic action (i.e., when the shaft is not rotating) is therefore very small. There are, therefore, only small hydrostatic forces in bearing 22 that cancel the destabilizing forces caused by hydrodynamic effects when the shaft is rotating, and so the stability of bearing 27 is only marginally improved. The stability of the bearing 27 was tested in experiments and the improvement in stability was found to be very small. So long as the shape of the recess 29 is that of an equilateral triangle as described in the above-cited article, then this will always be true. Even if the shape of recesses 29 were a triangle that is not equilateral, moreover, it would be difficult to achieve an attitude angle of sufficient magnitude substantially to improve the stability of the bearing 27 without substantially reducing its load-carrying capacity.

In summary, the objectives of the present invention are thus attained, generally, in a mechanism providing smooth accurate rotary motion by means of a bearing housing member 6 which guides the motion of a shaft 7 about an axis, with the bearings kept from making mechanical contact with the housing 6 by the thin film of pressurized fluid that flows from sets of opposed recesses in selected cylindrical surfaces of the housing 6 that surround the shaft 7. The improved bearing described uses an innovative method to achieve enhanced stability by orienting the hydrostatic component of the bearing restoring force such that the destabilizing component of the hydrodynamic restoring force is substantially eliminated. This is accomplished with the use of grooves 12 that connect the central bearing recesses 9 to the outlet resistance lands 13 which are located at a distance circumferentially displaced from the recesses 9. In addition, the shaft 7 is rotated in such a direction as to pump some of the fluid emanating from the orifices 8 back through the grooves 12 to the recesses 9, thereby reducing the flow rate of lubricant from the bearing 6.

Further modifications of the invention will occur to persons skilled in the art, including, as before stated, the use of the novel surface structure of the invention in either or both of the shaft or bore rotary hydrostatic bearings of any type, and with a wide variety of restrictor designs; and all such are deemed to fall within the spirit and scope of the invention as defined by the appended claims.

What is claimed is:

1. A rotary bearing having, in combination, a cylindrical housing surrounding a shaft extending longitudinally internally therealong and maintained separated from the inner surface of the housing by a thin pressurized film of fluid supplied from a fluid supply, with the load-carrying capacity of the bearing being subject, when the shaft is not rotating, to hydrostatic forces and to hydrodynamic action during shaft rotation; a plurality of similar fluid restriction orifices connected with the fluid supply and successively circumferentially disposed along said inner surface of the housing, and with each feeding pressurized fluid to an adjacent corresponding recess; and each recess being connected with laterally spaced and longitudinally extending grooves overlapping the next successive recess and its restriction orifice, with land regions provided on said inner surface extending from and between successive recesses and externally thereof so that the grooves may route fluid from the recesses across the lands to disrupt circumferential flow of fluid induced by rotation of the shaft and also out of the bearing.

2. A rotary bearing as claimed in claim 1 and in which the recesses are disposed relative to the land regions such that said hydrostatic forces substantially cancel any destabilizing forces generated by said hydrodynamic action, thereby enhancing the rotability of the bearing and enabling high rotational speeds.

3. A rotary bearing as claimed in claim 2 and in which a pair of grooves extend circumferentially away from each recess, diverging at least partially to overlap the next successive recess with land regions disposed therebetween.

4. A rotary bearing as claimed in claim 2 and in which the shaft is rotated in a direction such that fluid is also pumped from the outer land regions back to the recesses, reducing leakage rate from the bearing and reducing the required fluid pumping power.

* * * * *